US010735357B1

(12) United States Patent
Philip et al.

(10) Patent No.: US 10,735,357 B1
(45) Date of Patent: Aug. 4, 2020

(54) CROSS-PLATFORM MESSAGING SYSTEM

(71) Applicant: Bank of America Corporation, Charlotte, NC (US)

(72) Inventors: Charles Chandy Philip, Mumbai (IN); Jaya Prakash Pulavarti, Telangana (IN); Priya Birendra Yadav, Dombivli (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/254,485

(22) Filed: Jan. 22, 2019

(51) Int. Cl.
*G06Q 30/06* (2012.01)
*H04L 12/58* (2006.01)
*G06F 40/166* (2020.01)
*G06F 40/205* (2020.01)

(52) U.S. Cl.
CPC .......... *H04L 51/046* (2013.01); *G06F 40/166* (2020.01); *G06F 40/205* (2020.01); *H04L 51/36* (2013.01)

(58) Field of Classification Search
CPC ..... H04L 51/046; H04L 51/36; G06F 40/166; G06F 40/205
See application file for complete search history.

(56) References Cited

U.S. PATENT DOCUMENTS

| | | | |
|---|---|---|---|
| 6,182,059 B1 | 1/2001 | Angotti et al. | |
| 8,631,153 B2 | 1/2014 | Murthy et al. | |
| 8,745,091 B2 | 6/2014 | McHenry et al. | |
| 8,767,948 B1 | 7/2014 | Riahi et al. | |
| 9,386,152 B2 | 7/2016 | Riahi et al. | |
| 9,742,916 B1 | 8/2017 | Christopher | |
| 2005/0114533 A1* | 5/2005 | Hullfish | H04L 51/04 709/230 |
| 2005/0283726 A1* | 12/2005 | Lunati | G06F 40/232 715/257 |
| 2015/0358259 A1* | 12/2015 | Sterns | H04L 51/36 709/206 |
| 2017/0293922 A1* | 10/2017 | Rosenberg | H04L 51/046 |
| 2018/0174222 A1* | 6/2018 | Venkatakrishnan | G06Q 30/0633 |
| 2018/0331980 A1* | 11/2018 | Jernstrom | H04L 51/04 |

* cited by examiner

*Primary Examiner* — Soe Hlaing
(74) *Attorney, Agent, or Firm* — Michael A. Springs

(57) ABSTRACT

An apparatus includes a memory and a hardware processor. The hardware processor receives a first message from a first chat application and parses the first message to determine a plurality of words in the first message. The processor determines an intent of the first user and communicates a second message to the first chat application indicating the intent. The processor receives a third message confirming the intent and determines an action and an object. The processor determines a processing application and communicates a fourth message that includes the action and the object to the processing application. The processor receives a fifth message that indicates the results of performing the action on the object and communicates the fifth message to the first chat application. The processor receives a sixth message from a second, different chat application and communicates the sixth message to the first chat application.

21 Claims, 3 Drawing Sheets

CROSS-PLATFORM MESSAGING SYSTEM

TECHNICAL FIELD

This disclosure relates generally to chat messaging.

BACKGROUND

Users of computers and mobile devices use various chat messaging applications to communicate with one another.

SUMMARY OF THE DISCLOSURE

Users of computers and mobile devices use various chat messaging applications to communicate with one another. These users can use these messaging applications to send messages to other users on these messaging applications. The messages can include text, images, videos, files, and/or other information. The messages typically travel from a device of a first user to a chat server. The chat server then forwards the messages to a device of a second user.

In existing implementations, users are unable to use one chat messaging application to send chat messages to users on another chat messaging application. In other words, users are typically forced to use the same chat messaging application if they want to communicate with one another. As a result, if a first user is using a chat messaging application and a second user is using a different chat messaging application, then these two users are unable to send chat messages to one another.

This disclosure contemplates an unconventional system that allows users on different chat messaging applications to send chat messages to one another using their respective, but different chat messaging applications. The system includes a cross-platform messaging tool that performs natural language processing on chat messages and then communicates those messages or responses to those messages to other chat messaging applications. In this manner, the tool is able to relay messages from one chat messaging application to other, different chat messaging applications. By performing natural language processing on received messages, the tool reduces the load on the chat system (e.g., by removing certain words from messages, by preventing certain messages from being sent, and/or by generating automatic messages and/or responses).

According to an embodiment, an apparatus includes a memory and a hardware processor. The memory stores natural language processing rules. The hardware processor receives a first message from a first chat application of a first user and parses the first message to determine a plurality of words in the first message. The processor determines, based on the plurality of words and the natural language processing rules, an intent of the first user and communicates a second message to the first chat application of the first user indicating the intent. The processor also receives a third message from the first chat application confirming the intent and in response to the third message, determines, based on the plurality of words, an action and an object. The processor further determines, based on the intent, a processing application and communicates a fourth message that includes the action and the object to the processing application. The processor also receives a fifth message from the processing application that indicates the results of performing the action on the object and communicates the fifth message to the first chat application. The processor receives a sixth message from a second chat application of a second user. The second chat application is a different chat application from the first chat application. The processor communicates the sixth message to the first chat application. According to another embodiment, a method includes storing, by a memory, natural language processing rules and receiving, by a hardware processor communicatively coupled to the memory, a first message from a first chat application of a first user. The method also includes parsing, by the hardware processor, the first message to determine a plurality of words in the first message and determining, by the hardware processor, based on the plurality of words and the natural language processing rules, an intent of the first user. The method further includes communicating, by the hardware processor, a second message to the first chat application of the first user indicating the intent and receiving, by the hardware processor, a third message from the first chat application confirming the intent. The method also includes in response to the third message, determining, by the hardware processor, based on the plurality of words, an action and an object and determining, by the hardware processor, based on the intent, a processing application. The method further includes communicating, by the hardware processor, a fourth message that includes the action and the object to the processing application and receiving, by the hardware processor, a fifth message from the processing application that indicates the results of performing the action on the object. The method also includes communicating, by the hardware processor, the fifth message to the first chat application and receiving, by the hardware processor, a sixth message from a second chat application of a second user. The second chat application is a different chat application from the first chat application. The method also includes communicating, by the hardware processor, the sixth message to the first chat application.

According to yet another embodiment, a system includes a first device, a second device, a server, and a messaging tool. The first device of a first user executes a first chat application. The second device of a second user executes a second chat application. The second chat application is a different chat application than the first chat application. The server hosts a plurality of processing applications. The messaging tool stores natural language processing rules and receives a first message from the first chat application. The messaging tool parses the first message to determine a plurality of words in the first message and determines, based on the plurality of words and the natural language processing rules, an intent of the first user. The messaging tool also communicates a second message to the first chat application of the first user indicating the intent and receives a third message from the first chat application confirming the intent. The messaging tool further in response to the third message, determines, based on the plurality of words, an action and an object and determines, based on the intent, a processing application of the plurality of processing applications. The messaging tool also communicates a fourth message that includes the action and the object to the server and receives a fifth message from the server that indicates the results of performing the action on the object using the determined processing application. The messaging tool communicates the fifth message to the first chat application, receives a sixth message from the second chat application, and communicates the sixth message to the first chat application.

Certain embodiments provide one or more technical advantages. For example, an embodiment allows users on a first chat messaging application to send chat messages, using the first chat messaging application, to users on a second, different chat messaging application. As another example, an embodiment allows for message load to be reduced through natural language processing. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
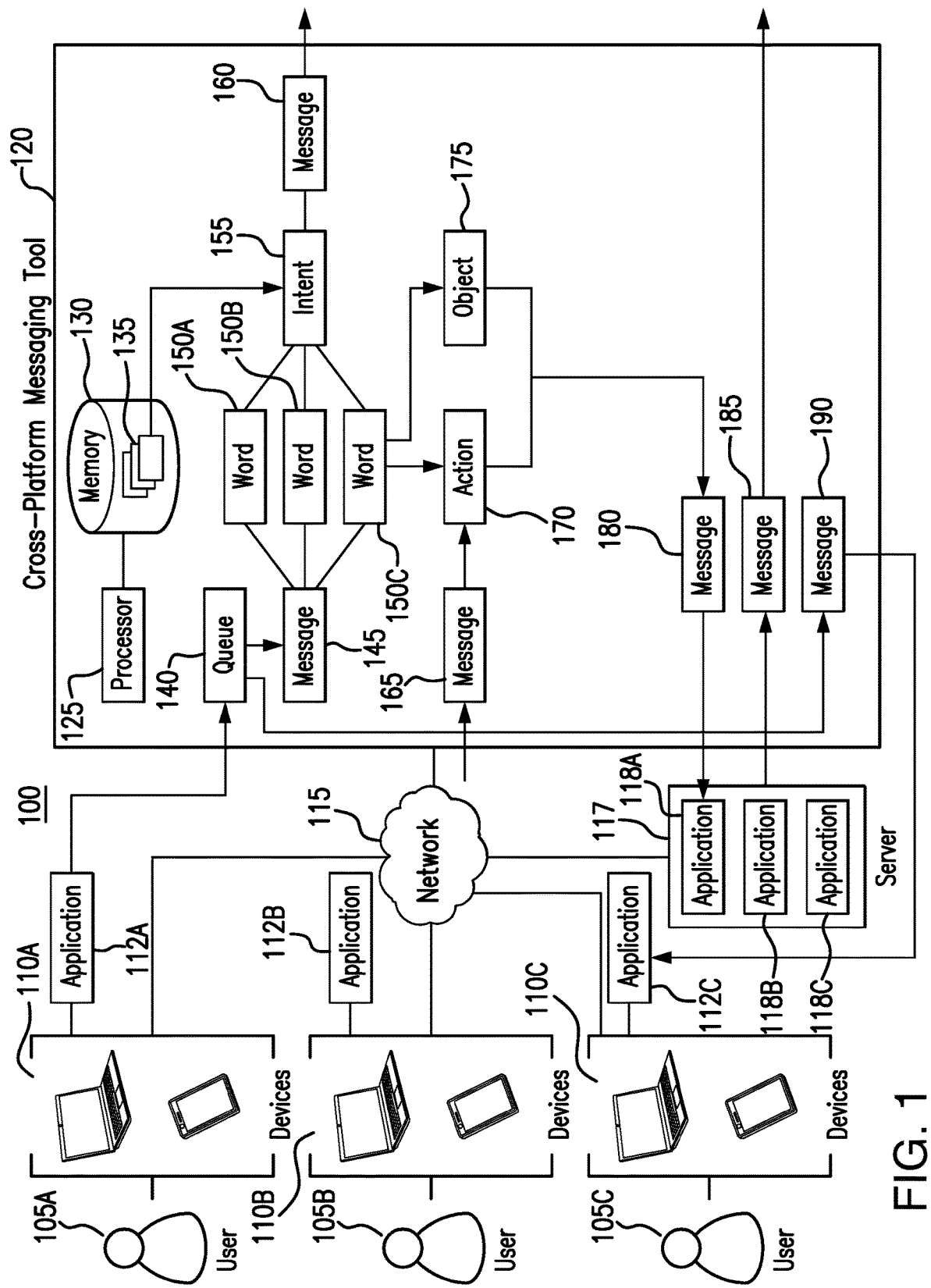
FIG. 1 illustrates an example system.
Figure 2:
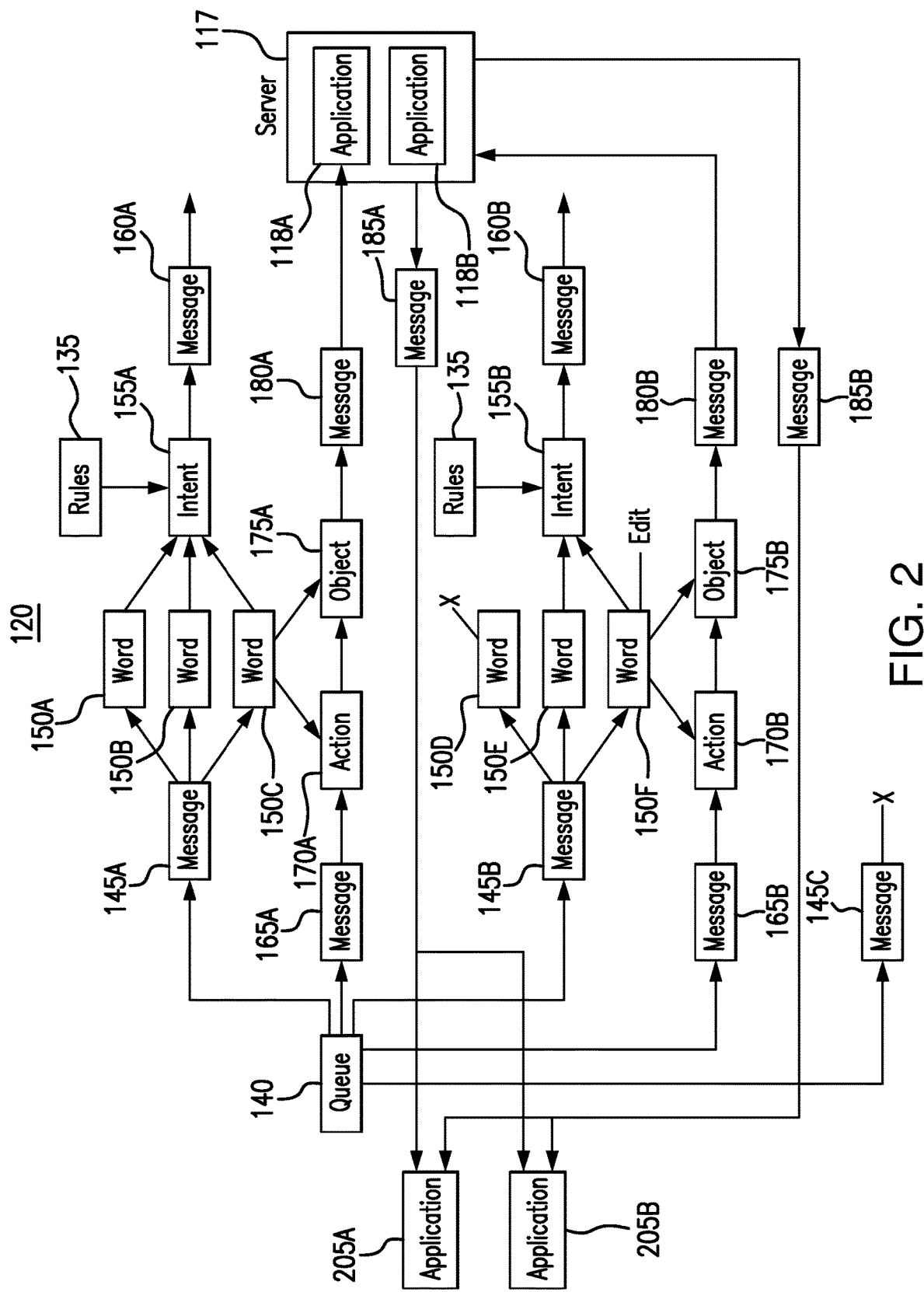
FIG. 2 illustrates an example cross-platform messaging tool of the system of FIG. 1.
Figure 3:
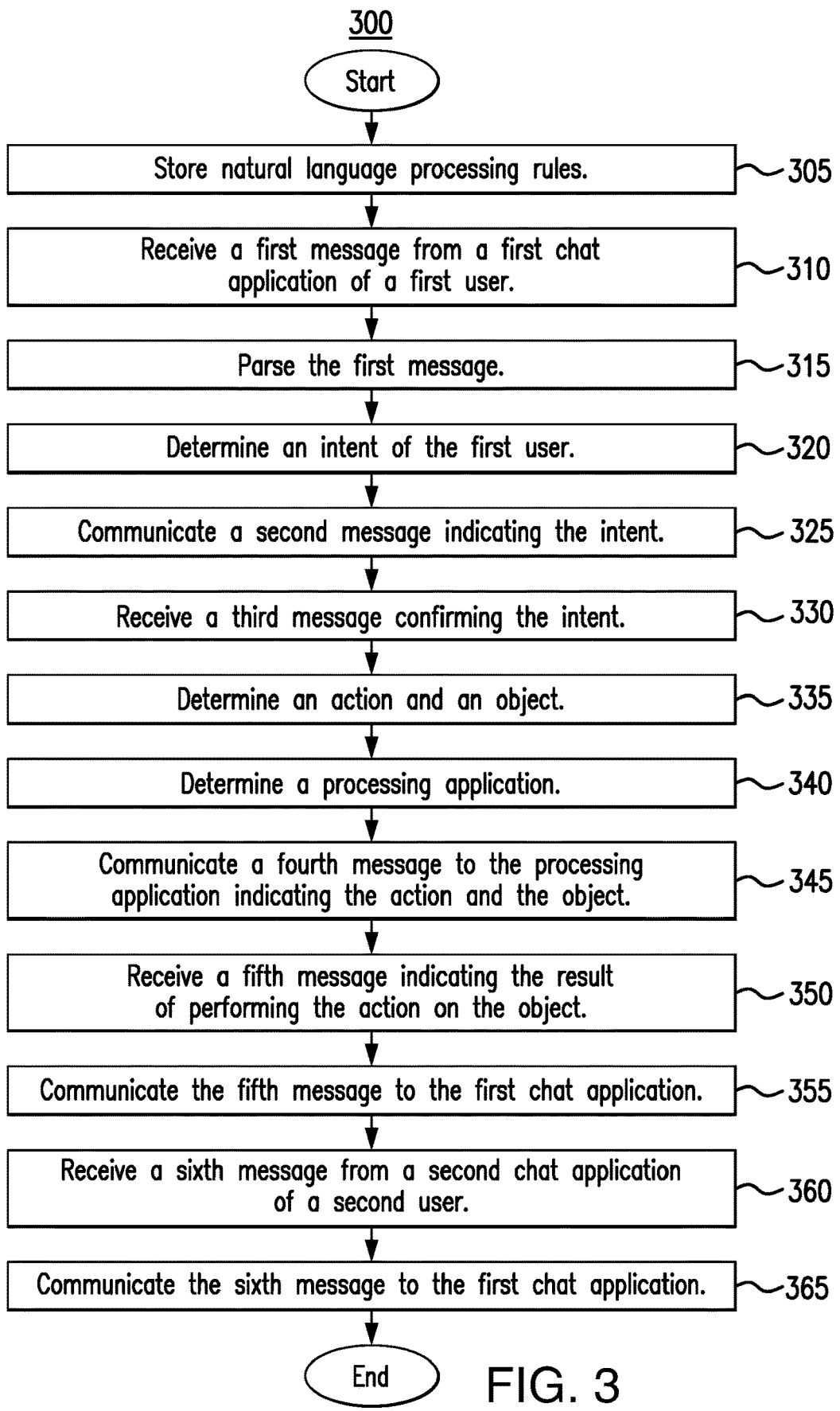
FIG. 3 is a flowchart illustrating a method for sending cross-platform chat messages using the system of FIG. 1.

Embodiments of the present disclosure and its advantages are best understood by referring to FIGS. 1 through 3 of the drawings, like numerals being used for like and corresponding parts of the various drawings.

Users of computers and mobile devices use various chat messaging applications to communicate with one another. These users can use these messaging applications to send messages to other users on these messaging applications. The messages can include text, images, videos, files, and/or other information. The messages typically travel from a device of a first user to a chat server. The chat server then forwards the messages to a device of a second user.

In existing implementations, users are unable to use one chat messaging application to send chat messages to users on another chat messaging application. In other words, users are typically forced to use the same chat messaging application if they want to communicate with one another. As a result, if a first user is using a chat messaging application and a second user is using a different chat messaging application, then these two users are unable to send chat messages to one another.

This disclosure contemplates an unconventional system that allows users on different chat messaging applications to send chat messages to one another using their respective, but different chat messaging applications. The system includes a cross-platform messaging tool that performs natural language processing on chat messages and then communicates those messages or responses to those messages to other chat messaging applications. In this manner, the tool is able to relay messages from one chat messaging application to other, different chat messaging applications. By performing natural language processing on received messages, the tool reduces the load on the chat system (e.g., by removing certain words from messages, by preventing certain messages from being sent, and/or by generating automatic messages and/or responses). The system and the messaging tool will be described in more detail using FIGS. 1 through 3.

FIG. 1 illustrates an example system 100. As seen in FIG. 1, system 100 includes one or more users 105, one or more devices 110, a network 115, a server 117, and a cross-platform messaging tool 120. Generally, system 100 allows users on different chat messaging applications to communicate with each other through their respective but different chat messaging applications. In certain embodiments, system 100 also performs natural language processing on messages to reduce the messaging load in system 100.

Users 105 use devices 110 to send chat messages to other users 105. For example, user 105A may communicate messages to users 105B or 105C using a chat messaging application 110A. Each user 105 may use any device that executes chat messaging applications to communicate with other users 105.

Devices 110 are used to execute chat messaging applications 112. In system 100, each user 105 has one or more devices 110. For example, user 105A uses devices 110A, user 105B uses devices 110B, and user 105C uses devices 110C. Each device 110 executes its own respective chat messaging application 112. For example, device 110A executes application 112A, device 110B executes application 112B, and device 110C executes application 112C. The chat messaging applications 112 may be used to send and receive messages to and from users 105 in system 100. These messages may include text, images, videos, files and/or other information.

In existing implementations, chat messaging applications 112 may not be able to send and/or receive messages to and from other chat messaging applications 112 if those chat messaging applications 112 are different. For example, user 105A may be using a chat messaging application 112A that communicates with a particular chat server. That chat server may not be configured to communicate messages to a different chat messaging application, such as chat messaging application 112C of user 105C. Similarly, user 105C may not use chat messaging application 112C to communicate messages to user 105A or application 112A. As a result, users 105A and 105C are not able to communicate with each other through their respective chat messaging applications 112, because those chat messaging applications 112 are different from each other and communicate with different servers that are not capable of communicating with each other.

Devices 110 include any appropriate device for communicating with components of system 100 over network 115. For example, devices 110 may be a telephone, a mobile phone, a computer, a laptop, a tablet, an automated assistant, and/or a cash register. This disclosure contemplates device 110 being any appropriate device for sending and receiving communications over network 115. As an example and not by way of limitation, device 110 may be a computer, a laptop, a wireless or cellular telephone, an electronic notebook, a personal digital assistant, a tablet, or any other device capable of receiving, processing, storing, and/or communicating information with other components of system 100. Device 110 may also include a user interface, such as a display, a microphone, keypad, or other appropriate terminal equipment usable by user 105. In some embodiments, an application executed by device 110 may perform the functions described herein.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Server 117 hosts one or more processing applications 118. Generally, applications 118 perform certain functions in response to messages communicated to server 117. For example, a message may identify a particular application 118 hosted by server 117. The message may also include information that will allow the identified application 118 to perform a requested action. After the identified application 118 performs the requested action, the application 118 may generate and communicate another message to indicate the results of the processing. For example, application 118A may determine the resource usage in system 100. If a user, such as user 105A, communicates a message requesting the resource usage in system 100, that message may be communicated to application 118A. In response to that message, application 118A may initiate processes that determine resource usage in other components of system 100. For example, application 118A may start processes on one more devices 110, network 115, and/or cross-platform messaging tool 120 to determine the resources that are being used in these components. For example, application 118A may determine processor, memory and bandwidth usage in these components. After application 118A determines the resource usage in system 100, application 118A may generate and communicate to user 105A a message indicating the resource usage.

Cross-platform messaging tool 120 generally allows different chat messaging applications 112 to communicate with each other. As seen in FIG. 1, cross-platform messaging tool 120 includes processor 125 and memory 130. This disclosure contemplates processor 125 and memory 130 being configured to perform any of the functions of cross-platform messaging tool 120 described herein. In certain embodiments, messaging tool 120 allows different applications 112 to communicate with each other and reduces the overall messaging load in system 100 through natural language processing.

Processor 125 is any electronic circuitry, including, but not limited to microprocessors, application specific integrated circuits (ASIC), application specific instruction set processor (ASIP), and/or state machines, that communicatively couples to memory 130 and controls the operation of automation tool 125. Processor 125 may be 8-bit, 16-bit, 32-bit, 64-bit or of any other suitable architecture. Processor 125 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 125 may include other hardware and software that operates to control and process information. Processor 125 executes software stored on memory to perform any of the functions described herein. Processor 125 controls the operation and administration of messaging tool 120 by processing information received from devices 110, network 115, and memory 130. Processor 125 may be a programmable logic device, a microcontroller, a microprocessor, any suitable processing device, or any suitable combination of the preceding. Processor 125 is not limited to a single processing device and may encompass multiple processing devices.

Memory 130 may store, either permanently or temporarily, data, operational software, or other information for processor 125. Memory 130 may include any one or a combination of volatile or non-volatile local or remote devices suitable for storing information. For example, memory 130 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 130, a disk, a CD, or a flash drive. In particular embodiments, the software may include an application executable by processor 125 to perform one or more of the functions described herein.

Messaging tool 120 stores one more natural language processing rules 135.

These rules 135 may be used to determine the subject and/or intent of a message communicated by a chat application 112. Rules 135 may also indicate the appropriate response to particular messages communicated by a chat application 112. In some embodiments, rules 135 can also be used to filter words (e.g., profanity and gibberish) out of received messages and/or to edit words in received messages (e.g., correcting spelling and/or grammar). In certain embodiments, rules 135 can also be used to reject received messages, such as for example, when a particular user 105 sends too many messages in a certain period of time. In this manner, rules 135 can be used to reduce the messaging load on messaging tool 120.

Messaging tool 120 implements a messaging queue 140. Messaging queue 140 generally stores messages received from chat messaging applications 112 in the order that those messages are received. Messaging tool 120 can retrieve messages from queue 140 for processing in the order that the messages were received. In this manner, queue 140 allows messaging tool 120 to receive multiple messages without needing to process those messages at the same time. Rather, messaging tool 120 may process those messages sequentially and communicate responses to those messages sequentially. In this manner, messaging tool 120 is protected from being overflooded by messages in system 100.

Cross-platform messaging tool 120 receives a message 145 from a chat application 112. Messaging tool 120 may retrieve message 145 from queue 140. In the example of FIG. 1, application 112A communicates message 145 to messaging tool 120. Message 145 enters queue 140. Messaging tool 120 then retrieves message 145 from queue 140. Message 145 may be a chat message generated by a user 105. The message 145 may be intended for another user 105 in system 100. Message 145 include any information such as text, image, videos, files and/or other information.

Messaging tool 120 parses message 145 to determine one or more words 150 that are in message 145. In the example of FIG. 1, messaging tool 120 parses message 145 to determine words 150A, 150B, and 150C. These words 150 may appear somewhere in message 145. Messaging tool 120 may use a stored dictionary and/or rules 135 to determine which words 150 in message 145 are significant. Words 150 can be used and/or analyzed to determine how messages 145 should be processed and/or responded to.

Messaging tool 120 may use rules 135 to analyze words 150 of message 145. Based on this analysis, messaging tool 120 may determine an intent 155 of message 145. For example, if message 145 requests resource usage in system 100, messaging tool 120 may determine that the intent 155 of message 145 is to determine resource usage. In this instance, words 150 may include "resource," "usage," "processing," "bandwidth," "memory," and/or "much." Based on these words, messaging tool 120 can determine the intent 155 of message 145.

Messaging tool 120 may then generate message 160 to confirm the identified intent 155. Using the previous example, message 160 may ask whether the user is trying to determine resource usage. Messaging tool 120 may then communicate message 160 back to the user who sent message 145 and/or to the chat application 112 that communicated message 145.

Messaging tool 120 may receive message 165 confirming the determined intent 155. Message 165 may be communicated by the user 105 or chat application 112 that communicated message 145. In some embodiments, message 165 may be received by messaging tool 120 and placed in queue 140 for subsequent processing. If message 165 does not confirm intent 155, then messaging tool 120 may analyze words 150 again using rules 135 to determine another intent 155. If message 165 confirms the determined intent 155, then messaging tool 120 may proceed with the processing of message 145. Messaging tool 120 may update rules 135 based on message 165. For example, if message 165 indicates that the determined intent 155 was incorrect, messaging tool 120 may update rules 135 so that the same parsed words 150 do not subsequently result in the same, incorrect determination of intent 155. Messaging tool 120 may also update rules 135 when message 165 indicates that the determined intent 155 was correct, so that future instances of words 150 will result in the correct determination of intent 155.

Messaging tool 120 may determine an action 170 and an object 175 based on words 150. In some instances, action 170 is one of the words 150 and object 175 is another one of the words 150 in message 145. By determining the action 170 and the object 175, messaging tool 120 may determine a requested function to be performed. Using the previous example, action 170 may be to determine resource usage and object 175 may be system 100. This disclosure contemplates messaging tool determining any suitable action 170 and any suitable object 175. Generally, action 170 is a function to be performed and object 175 is a component on which the function is to be performed.

Messaging tool 120 may generate a message 180 that identifies action 170 and object 175. Messaging tool 120 may then determine a processing application 118 based on intent 155. For example, if intent 155 indicates that message 145 is requesting resource usage, message 180 may identify a processing application 118 that determines resource usage. Messaging tool 120 then communicates message 180 to server 117 and the determined application 118. In some embodiments, message 180 may identify the determined application 118 so that server 117 can forward message 180 to the determined application 118.

Messaging tool 120 receives a response message 185 from server 117 indicating the results of performing the action 170 on object 175 indicated by message 180. For example, message 185 may indicate the resource usage of system 100. Messaging tool 120 may then communicate message 185 to one or more chat applications 112. For example, messaging tool 120 may communicate message 185 to the chat application 112 that communicated message 145. As another example, message 145 may indicate an intended recipient other than the sender of message 145. Messaging tool 120 may communicate message 185 to the chat application 112 of the intended recipient.

In some instances, messaging tool 120 may relay a message to a different chat application. In the example of FIG. 1, messaging tool 120 receives and retrieves a message 190 from queue 140. Message 190 may have been communicated by chat application 112A and user 105A. Message 190 may indicate an intended recipient that is different from user 105A and chat application 112A. In these instances, messaging tool 120 may forward message 190 to the intended recipient. In the example of FIG. 1, messaging tool 120 sends message 190 to chat application 112C of user 105C. Chat application 112C may be different from chat application 112A. As a result, chat application 112A may not normally be able to communicate message 190 to chat application 112C. However, messaging tool 120 allows chat application 112A to communicate message 190 to chat application 112C. As a result, user 105A can communicate with user 105C through their respective chat applications 112, even though those chat applications 112 are different from one another. In some instances, messaging tool 120 may communicate message 190 to a different chat application 112 of the sending user. Using the example of FIG. 1, messaging tool 120 may communicate message 190 to a chat application 112 of user 105 that is different from chat application 112A, which communicated message 190 to messaging tool 120. In this manner, a user, such as user 105A, is able to communicate messages from one chat application 112 to another different chat application 112 of user 105A.

In certain embodiments, by using messaging tool 120, different chat applications 112 can communicate messages to one another. Additionally, messaging tool 120 may reduce the overall messaging load in system 100 by performing natural language processing on received messages. For example, certain responses may be generated and communicated to chat applications 112 by messaging tool 120 after they have been processed by applications 118. In this manner, messages to and from other users may not be needed to respond to a message communicated by a chat application 112.

FIG. 2 illustrates an example cross platform messaging tool 120 of the system 100 of FIG. 1. Generally, messaging tool 120 allows different chat applications to communicate messages to one another. Additionally, messaging tool 120 performs natural language processing on received messages to reduce the message load in system 100.

Messaging tool 120 implements queue 140 to manage incoming messages. As seen in FIG. 2, messaging tool 120 may receive messages from one or more chat applications 205A and 205B. Application 205A may be a different chat application than chat application 205B. As a result, application 205A may not normally be able to communicate messages to application 205B. Messaging tool 120 allows application 205A to communicate messages to application 205B.

Queue 140 receives messages from applications 205A and 205B. In the example of FIG. 2, queue 140 receives message 145A. Message 145A may be a chat message that includes text, images, videos, files, and/or other information. Queue 140 may receive message 145A from chat application 205A or application 205B. Generally, queue 140 stores messages in the order that they are retrieved so that messaging tool 120 can process those messages in the order that they are received.

Messaging tool 120 parses message 145A to determine one or more words 150 within message 145A. In the example of FIG. 2, messaging tool 120 determines that words 150A, 150B, and 150C are in message 145A. Messaging tool 120 may use these parsed words 150 to determine certain aspects of message 145A.

Messaging tool 120 may use stored rules 135 to analyze words 150A, 150B, and 150C. Based on this analysis, messaging tool 120 may determine that message 145A had an intent 155A. Intent 155A may indicate the purpose and/or the subject of message 145A. Messaging tool 120 may then generate a message 160A to confirm the determined intent 155A. Messaging tool 120 may communicate message 160A to application 205A and/or application 205B. In some instances, messaging tool 120 communicates message 160A back to the application 205 that communicated message 145A.

Messaging tool 120 may receive, through queue 140, a message 165A that confirms or denies the determined intent 155A indicated by message 160A. If message 165A denies or rejects the determined intent 155A, messaging tool 120 may analyze words 150A, 150B, and 150C, again, using rules 135 to determine another intent 155. If message 165A confirms the determined intent 155 messaging tool 120 may continue processing message 145A.

Messaging tool 120 determines an action 170A and an object 175A from words 150A, 150B, and 150C. Action 170A may indicate an action or function to be performed on object 175A. Generally, messaging tool 120 may determine how to process message 145A based on intent 155A, action 170A, and object 175A. Messaging tool 120 may determine a processing application 118 to perform action 170A on object 175A. For example, if intent 155A is to determine resource usage then messaging tool 120 may communicate a message to a processing application 118 that determines resource usage.

Messaging tool 120 generates message 180A to communicate action 170A and object 175A to a server 117. In some embodiments, message 180A may identify a processing application 118 determined using intent 155A. Messaging tool 120 may communicate message 180A to server 117.

Server 117 may process message 180A. For example, server 117 may forward message 180A to an identified processing application 118 such as application 118A. The processing application 118 then performs the identified action 170A on object 175A. After performing the requested action 170A, application 118A may generate and communicate message 185A to messaging tool 120. Messaging tool 120 may communicate message 185A to one or more chat applications 205. For example, messaging tool 120 may communicate message 185A to application 205A and/or application 205B, even though application 205A and application 205B are different.

Application 205A and application 205B may be executed by different devices and/or by different users. In some instances, applications 205A and 205B are run by the same device and/or the same user.

Messaging tool 120 may perform natural language processing to reduce the message load on messaging tool 120 in some embodiments. As shown in the example of FIG. 2, messaging tool 120 receives through queue 140 a message 145B. Messaging tool 120 then parses message 145B to determine words 150D, 150E, and 150F. Messaging tool 120 may then apply rules 135 on words 150D, 150E, and 150F to perform certain actions. For example, messaging tool 120 may remove or delete word 150D based on rules 135. This may occur because rule 150D may be determined to be gibberish and/or profanity according to rules 135. By removing word 150D, messaging tool 120 reduces the number of words 150 to be analyzed and/or improves the accuracy of intent 155B, action 170B, and object 175B. As another example, messaging tool 120 edits word 150F based on rules 135. For example, messaging tool 120 may correct the spelling of word 150F based on rules 135. By correcting and/or editing word 150F messaging tool 120 may improve the accuracy of determining intent, actions, and objects, based on words 150D, 150E, and 150F. In this manner, the load on messaging tool 120 is reduced.

Messaging tool 120 may then determine an intent 155B for words 150E and 150F using rules 135. The intent 155B may indicate the purpose or subject of messages 145B. Messaging tool 120 may then generate and communicate message 160B to confirm the determined intent 155B. Messaging tool 120 may communicate message 160B to application 205A and/or application 205B.

Messaging tool 120 receives messaging 165B through queue 140. Message 165B may confirm or deny the determined intent 155B. If message 165B denies intent 155B, messaging tool 120 may analyze words 150E and 150F, again, using rules 135 to determine another intent 155B. If message 165B confirms intent 155B, messaging tool 120 may continue processing message 145B.

Messaging tool 120 determines action 170B and object 175B based on words 150E and 150F. Messaging tool 120 may also determine a processing application based on the confirmed intent 155B. Messaging tool 120 may then generate messages 180B, identifying action 170B, and object 175B. Message 180D may also identify the identified processing application. Messaging tool 120 communicates message 180B to server 117. Server 117 forwards message 180B to the identified application 118. The application 118 then performs the action 170B on object 175B. Server 117 generates message 185B that identifies the results of performing action 170B on object 175B. Server 117 communicates message 185B to messaging tool 120. Messaging tool 120 communicates message 185B to one or more of application 205A and/or 205B.

In some embodiments, messaging tool 120 may reject a received message based on rules 135. In the example of FIG. 2, messaging tool 120 receives message 145C through queue 140. Rules 135 may indicate that message 145C should be rejected, and in response, messaging tool 120 rejects message 145C. For example, rules 135 may limit the number of messages that a particular application 205 may communicate to messaging tool 120 in a certain period of time. Message 145C may exceed the number of messages in that period of time, and so, messaging tool 120 rejects message 145C. As another example, rules 135 may indicate that messages containing certain words, such as profanity, should be rejected. In response, messaging tool 120 may reject message 145C because it contains profanity.

FIG. 3 is a flow chart illustrating a method 300 for sending cross-platform chat messages using the system 100 of FIG. 1. In certain embodiments, messaging tool 120 performs method 300. By performing method 300, messaging tool 120 allows different chat messaging applications to communicate with one another and reduces the messaging load on the system.

Messaging tool 120 begins by storing natural language processing rules in step 305. In step 310, messaging tool 120 receives a first message from a first chat application of a first user. The first message may request a certain action be performed on a certain object. Messaging tool 120 parses the first message in step 315. By parsing the first message, messaging tool 120 may identify one or more words in the first message. In step 320, messaging tool 120 determines an intent of the first user. Messaging tool 120 may determine the intent by using the words parsed from the first message and the natural language processing rules.

Messaging tool 120 communicates a second message indicating the intent in step 325. The second message may be communicated to the first chat application. In step 330, messaging tool 120 receives a third message confirming the intent. Messaging tool 120 determines an action and an object using the words parsed from the first message in step 335. In step 340, messaging tool 120 determines a processing application based on the determined intent.

In step 345, messaging tool 120 communicates a fourth message to the processing application indicating the action and the object. The processing application may be hosted by a server that is separate from messaging tool 120. The fourth message may be communicated to the server and the server may forward the message to the determined processing application. In step 350, messaging tool receives a fifth message indicating the result of performing the action on the object. The fifth message may be generated by the server that hosted the processing application. Messaging tool 120 communicates the fifth message to the first chat application in step 355.

In step 360, messaging tool 120 receives a sixth message from a second chat application of a second user. The second chat application may be a different chat application than the first chat application. Normally, the second chat application cannot communicate messages to the first chat application and vice versa. In step 365, messaging tool 120 communicates that sixth message to the first chat application. In this manner, messages from the second chat application are relayed to the first chat application.

Modifications, additions, or omissions may be made to method 300 depicted in FIG. 3. Method 300 may include more, fewer, or other steps. For example, steps may be performed in parallel or in any suitable order. While discussed as messaging tool 120 performing the steps, any suitable component of system 100, such as device(s) 110 for example, may perform one or more steps of the methods.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus comprising:
a memory configured to store natural language processing rules; and
a hardware processor communicatively coupled to the memory, the hardware processor configured to:
receive a first message from a first chat application of a first user;
parse the first message to determine a plurality of words in the first message;
determine, based on the plurality of words and the natural language processing rules, an intent of the first user;
communicate a second message to the first chat application of the first user indicating the intent;
receive a third message from the first chat application confirming the intent;
in response to the third message, determine, based on the plurality of words, an action and an object;
determine, based on the intent, a processing application;
communicate a fourth message comprising the action and the object to the processing application;
receive a fifth message from the processing application that indicates the results of performing the action on the object;
communicate the fifth message to the first chat application;
receive a sixth message from a second chat application of a second user, the second chat application is a different chat application from the first chat application;
communicate the sixth message to the first chat application;
parse the sixth message to determine a plurality of words in the sixth message;
determine, based on the plurality of words in the sixth message and the natural language processing rules, an intent of the second user;
determine, based on the plurality of words in the sixth message, an action and an object in the second message;
determine, based on the intent of the second user, a second processing application;
receive a seventh message from the second processing application that indicates the results of performing the action in the second message on the object in the second message; and
communicate the seventh message to the first chat application.

2. The apparatus of claim 1, wherein the hardware processor is further configured implement a queue.

3. The apparatus of claim 1, wherein the hardware processor is further configured to remove a word from the sixth message based on the natural language processing rules before communicating the sixth message to the first chat application.

4. The apparatus of claim 1, wherein the hardware processor is further configured to communicate the sixth message to the second chat application of the first user.

5. The apparatus of claim 1, wherein the hardware processor is further configured to correct a word from the sixth message before communicating the sixth message to the first chat application.

6. The apparatus of claim 1, wherein the hardware processor is further configured to receive the first message from a queue.

7. The apparatus of claim 1, wherein the action determined in response to the third message is a word in the third message.

8. A method comprising:
storing, by a memory, natural language processing rules; and
receiving, by a hardware processor communicatively coupled to the memory, a first message from a first chat application of a first user;
parsing, by the hardware processor, the first message to determine a plurality of words in the first message;
determining, by the hardware processor, based on the plurality of words and the natural language processing rules, an intent of the first user;
communicating, by the hardware processor, a second message to the first chat application of the first user indicating the intent;
receiving, by the hardware processor, a third message from the first chat application confirming the intent;
in response to the third message, determining, by the hardware processor, based on the plurality of words, an action and an object;

determining, by the hardware processor, based on the intent, a processing application;
communicating, by the hardware processor, a fourth message comprising the action and the object to the processing application;
receiving, by the hardware processor, a fifth message from the processing application that indicates the results of performing the action on the object;
communicating, by the hardware processor, the fifth message to the first chat application;
receiving, by the hardware processor, a sixth message from a second chat application of a second user, the second chat application is a different chat application from the first chat application;
communicating, by the hardware processor, the sixth message to the first chat application;
parsing, by the hardware processor, the sixth message to determine a plurality of words in the sixth message;
determining, by the hardware processor, based on the plurality of words in the sixth message and the natural language processing rules, an intent of the second user;
determining, by the hardware processor, based on the plurality of words in the sixth message, an action and an object in the second message;
determining, by the hardware processor, based on the intent of the second user, a second processing application;
receiving, by the hardware processor, a seventh message from the second processing application that indicates the results of performing the action in the second message on the object in the second message; and
communicating, by the hardware processor, the seventh message to the first chat application.

9. The method of claim 8, further comprising implementing a queue.

10. The method of claim 8, further comprising removing, by the hardware processor, a word from the sixth message based on the natural language processing rules before communicating the sixth message to the first chat application.

11. The method of claim 8, further comprising communicating, by the hardware processor, the sixth message to the second chat application of the first user.

12. The method of claim 8, further comprising correcting, by the hardware processor, a word from the sixth message before communicating the sixth message to the first chat application.

13. The method of claim 8, further comprising receiving, by the hardware processor, the first message from a queue.

14. The method of claim 8, wherein the action determined in response to the third message is a word in the third message.

15. A system comprising:
a first device of a first user, the first device configured to execute a first chat application;
a second device of a second user, the second device configured to execute a second chat application, the second chat application is a different chat application than the first chat application;
a server configured to host a plurality of processing applications; and
a messaging tool configured to:
store natural language processing rules;
receive a first message from the first chat application;
parse the first message to determine a plurality of words in the first message;
determine, based on the plurality of words and the natural language processing rules, an intent of the first user;
communicate a second message to the first chat application of the first user indicating the intent;
receive a third message from the first chat application confirming the intent;
in response to the third message, determine, based on the plurality of words, an action and an object;
determine, based on the intent, a processing application of the plurality of processing applications;
communicate a fourth message comprising the action and the object to the server;
receive a fifth message from the server that indicates the results of performing the action on the object using the determined processing application;
communicate the fifth message to the first chat application;
receive a sixth message from the second chat application;
communicate the sixth message to the first chat application;
parse the sixth message to determine a plurality of words in the sixth message;
determine, based on the plurality of words in the sixth message and the natural language processing rules, an intent of the second user;
determine, based on the plurality of words in the sixth message, an action and an object in the second message;
determine, based on the intent of the second user, a second processing application;
receive a seventh message from the second processing application that indicates the results of performing the action in the second message on the object in the second message; and
communicate the seventh message to the first chat application.

16. The system of claim 15, wherein the messaging tool is further configured implement a queue.

17. The system of claim 15, wherein the messaging tool is further configured to remove a word from the sixth message based on the natural language processing rules before communicating the sixth message to the first chat application.

18. The system of claim 15, wherein the messaging tool is further configured to communicate the sixth message to the second chat application of the first user.

19. The system of claim 15, wherein the messaging tool is further configured to correct a word from the sixth message before communicating the sixth message to the first chat application.

20. The system of claim 15, wherein the messaging tool is further configured to receive the first message from a queue.

21. The system of claim 15, wherein the action determined in response to the third message is a word in the third message.

* * * * *